(12) United States Patent
Kazadi

(10) Patent No.: US 9,702,633 B2
(45) Date of Patent: Jul. 11, 2017

(54) ENTROCHEMICAL ENERGY TRANSFER SYSTEM AND A PROCESS FOR OBTAINING WORK FROM ENVIRONMENTAL THERMAL ENERGY

(71) Applicant: Sanza T. Kazadi, Alhambra, CA (US)

(72) Inventor: Sanza T. Kazadi, Alhambra, CA (US)

(*) Notice: Subject to any disclaimer, the term of this patent is extended or adjusted under 35 U.S.C. 154(b) by 215 days.

(21) Appl. No.: 14/606,671

(22) Filed: Jan. 27, 2015

(65) Prior Publication Data

US 2016/0091256 A1 Mar. 31, 2016

Related U.S. Application Data

(63) Continuation-in-part of application No. 14/572,707, filed on Dec. 16, 2014.

(60) Provisional application No. 62/056,279, filed on Sep. 26, 2014, provisional application No. 62/059,859, filed on Oct. 4, 2014.

(51) Int. Cl.
| | |
|---|---|
| *F25D 23/00* | (2006.01) |
| *F28D 15/00* | (2006.01) |
| *F28D 21/00* | (2006.01) |
| *F24J 3/00* | (2006.01) |
| *F25B 17/02* | (2006.01) |
| *F28D 15/02* | (2006.01) |
| *F28D 20/00* | (2006.01) |

(52) U.S. Cl.
CPC ............... *F28D 15/00* (2013.01); *F24J 3/00* (2013.01); *F25B 17/02* (2013.01); *F28D 21/00* (2013.01); *F28D 15/02* (2013.01); *F28D 20/003* (2013.01); *F28D 21/0015* (2013.01); *Y02B 30/62* (2013.01)

(58) Field of Classification Search
CPC ..... F28D 15/00; F28D 3/04; F28D 3/00; F28D 13/00; F28D 21/0001
See application file for complete search history.

(56) References Cited

U.S. PATENT DOCUMENTS

| | | |
|---|---|---|
| 4,205,529 A | 6/1980 | Ko |
| 4,227,375 A | 10/1980 | Tompkins et al. |
| 4,373,347 A | 2/1983 | Howell et al. |

(Continued)

OTHER PUBLICATIONS

Kazadi et al Distillation Based on Solar Chimney-Mediated Energy Harvesting. Jisan Research Institute, Mar. 5, 2013 i.*

*Primary Examiner* — Elizabeth Martin
(74) *Attorney, Agent, or Firm* — Invent Capture, LLC.; Samuel S. Cho

(57) ABSTRACT

An entrochemical energy transfer system and a related process for obtaining work from environmental thermal energy are disclosed. In one example, a plurality of linked entrochemical cells with nested chambers provides an aggregate thermal gradient of each entrochemical cell by transferring environmental thermal energy in and/or out of the plurality of linked entrochemical cells. The aggregate thermal gradient generated from the plurality of linked entrochemical cells can be utilized as an environmentally-friendly energy source for human needs. The entrochemical energy transfer system and the related process for obtaining work from environmental thermal energy utilize a set of entropy transfers from Earth's day and night thermal energy inflows and outflows. Furthermore, in one example, the process for obtaining work from environmental thermal energy involves two steps, each step resulting in entropic increases and transfers.

9 Claims, 8 Drawing Sheets

(56) References Cited

U.S. PATENT DOCUMENTS

| | | | |
|---|---|---|---|
| 4,819,446 A | 4/1989 | Moore | |
| 4,832,115 A * | 5/1989 | Albers | B01D 1/14 165/104.31 |
| 6,463,750 B2 | 10/2002 | Assaf | |
| 7,938,888 B2 | 5/2011 | Assaf | |
| 8,490,427 B2 | 7/2013 | Erickson | |

* cited by examiner

100

200

700

800

1100

ENTROCHEMICAL ENERGY TRANSFER SYSTEM AND A PROCESS FOR OBTAINING WORK FROM ENVIRONMENTAL THERMAL ENERGY

RELATED APPLICATIONS

This patent application claims priority to a US provisional application, U.S. 62/059,859, which was filed on Oct. 4, 2014. Furthermore, this patent application also claims priority to a US provisional application, U.S. 62/056,279, which was filed on Sep. 26, 2014. Moreover, this patent application is a continuation-in-part application to a US non-provisional application, U.S. Ser. No. 14/572,707, which was filed on Dec. 16, 2014.

FIELD OF THE INVENTION

The present invention relates to thermal transfer systems. In particular the present invention relates to an encapsulated chain of entrochemical cells that enable formation of a unique structure called the nested heat transfer system. The present invention also relates to a process for obtaining work from environmental thermal energy. Furthermore, the present invention also relates to an entrochemical energy transfer system.

BACKGROUND OF THE INVENTION

A number of conventional technologies can move thermal energy from one point to another. One conventional method of producing a cooling or warming effect is invoking an evaporation of a liquid at one location in a device, followed by a condensation of the corresponding vapor (i.e. the evaporated liquid) at another location in the device. The evaporation removes thermal energy from the liquid, while the condensation deposits the thermal energy at the point of condensation. The overall effect is the movement of heat from one location to another location in the device. The evaporation and condensation effect is a fundamental process for existing heating and cooling devices, such as absorption refrigerators, chillers, and some kinds of heat pumps.

Mechanisms of action that enable heating and cooling devices are varied. For example, desiccants can be utilized to absorb vapor from a volatile liquid in a reaction chamber, which lowers the pressure inside a reaction chamber and indirectly drives evaporation from a pool of volatile liquid. Alternatively, mechanical pumps can be utilized to pump vapor out of a reaction chamber and to compress the vapor in a second chamber. The removal of vapor in the reaction chamber reduces pressure and lowers the temperature of the remaining vapor, causing the liquid pool to boil. The compression of the vapor in the second chamber increases the temperature and enables the heat to be transferred out of the second chamber, while the vapor condenses to liquid. The cooled and condensed liquid then returns to the reaction chamber.

Many conventional heat transfer systems are "closed" systems, and the evaporated liquid is typically required to return to the location of evaporation to continue the cycle. In order to cycle the liquid from one point to another point, energy can either be exerted initially to mobilize the liquid at an initial stage, or exerted later to recycle the liquid after the initial thermal transfer is accomplished. For heat transfer devices that utilize desiccants to absorb vapor and to drive evaporation, energy is exerted to drive the liquid and the desiccant apart and also to return the liquid to the point of evaporation. Typically, heating is utilized as a method of the energy exertion in this process. The heat can come from solar energy, electrical heaters, fuel burning, or another source of heat generation.

On the other hand, for heat transfer devices that utilize heat pumps to drive the movement of heat, the heat pumps may be powered by electric motors, mechanical systems such as windmills or water wheels, or other devices designed to deliver motive force. For the heat transfer devices that utilize the heat pumps, the return of liquid to the evaporation point can be active (i.e. forced by a heat pump) or passive (i.e. no active usage of the heat pump). These conventional energy transfer devices are closed-loop systems that act as a net "energy sink," thus requiring an external energy exertion.

In contrast, energy transfer systems that utilize environmental energy to drive the process of energy transfer can be viewed as "energy sources," rather than as energy sinks. For example, a renewable energy transfer system, such as a solar-powered chiller or a solar-powered refrigerator, can transduce environmental radiant energy into electrical energy, which can be subsequently utilized to drive a pump.

Two significant issues facing our modern society are the availability of energy and the growing surplus of heat in our ecosystem. These two issues may be intertwined, and thus, a solution to one issue generally produces problems for the other issue. Nevertheless, because heat is a form of energy, the buildup of heat in our planetary system may represent an opportunity for efficient use of renewable energy sources. If a novel energy transfer system can utilize the growing surplus of heat in our planet's ecosystem to drive entropic transfers, it may be able to contribute to a potential blunting or reduction of carbon dioxide-induced rising global temperatures, while efficiently harnessing environmental energy to perform useful work.

Furthermore, if the novel energy transfer system can also utilize the fact that our planet's rotation generates entropic and thermal changes on a daily basis, the novel energy transfer system may also be able to transform environmental energy into a useful energy source with a minimal carbon emissions footprint. For example, during any given day, exposed planetary elements on Earth, such as land, water, and air, heat up. This daily planetary thermal change increases an entropic capacity of our planet to enable spontaneous entropic transfer. It should be noted that spontaneous entropic transfers already occur in nature in the form of natural water evaporation. At night, the natural cooling of Earth leads to a decrease in the entropic potential of our planet. As a result, entropy decreases through energy transfers out of the earth system. This leads to condensation, which can drive weather, dew formations, and moisture formations on Earth. Our planet's natural day-night cycles represent an energetic process, into which a novel energy transfer device can connect to yield environmentally-friendly energy with near-zero to no carbon dioxide emissions.

Because Earth's thermal transfers and entropic changes due to day-night cycles do not occur in a closed system, harnessing environmental thermal energy for the purposes of doing work does not violate the first or the second law of thermodynamics. Thus, accessing Earth's energy flux, which reverses its direction during its day-night cycles, for production of useful work in a novel energy transfer system is physically and theoretically sound, unlike a case of a closed system with a stagnant and static thermal energy pool. The cyclical and natural thermal transfers that occur in our planet daily provide an opportunity for the novel energy transfer system to "plug into" the planet's day-night thermal cycles to provide a useful work for human needs without necessitating fossil fuel burning.

Therefore, it may be desirable to provide a novel process for obtaining work from environmental thermal energy. Furthermore, it may be also desirable to provide a novel entrochemical energy transfer system that utilizes this novel process of obtaining work from the environmental thermal energy.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for extracting environmental thermal energy with an energy transfer system is disclosed. This method comprises the steps of: generating a concentrated water solution from a water solution containing a non-volatile solute by bringing the water solution into contact with a quantity of air containing less water vapor than an equilibrium vapor pressure of the water solution; developing a thermal gradient per entrochemical cell inside a linear entrochemical array contained in the energy transfer system, wherein the concentrated water solution is deposited into a first chamber of an entrochemical cell of the linear entrochemical array, and wherein a lower concentration solution is deposited into a second chamber of the entrochemical cell of the linear entrochemical array; generating a wet vacuum in the entrochemical cell of the linear entrochemical array to induce the thermal gradient per entrochemical cell inside the linear entrochemical array; and generating an aggregate thermal gradient by accumulating a plurality of the thermal gradient per entrochemical cell inside the linear entrochemical array contained in the energy transfer system.

DETAILED DESCRIPTION

Figure 1:
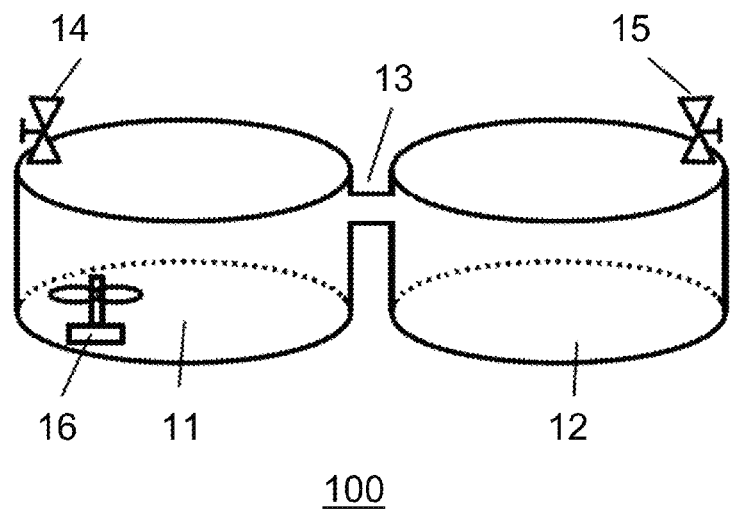
FIG. 1 shows a single enhanced entrochemical cell, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble apparatuses and/or supports which are associated with or parts of a nested heat transfer system, an entrochemical energy transfer system, and/or a process for obtaining work from environmental thermal energy. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the Specification are not necessarily all referring to the same embodiment. Furthermore, separate or alternative embodiments are not necessarily mutually exclusive of other embodiments.

Industrial thermal processes involving a cooling substance called the "refrigerant" that transfers heat to a heat-absorbing substance, called the "absorbent," have been utilized since the 18$^{th}$ century. Various published patent documents, including U.S. Pat. Nos. 8,490,427, 7,938,888, 6,463,750, 4,819,446, 4,205,529, 4,227,375, and 4,373,347, describe using desiccant in either liquid or solid forms for the absorption of the vapor state of a liquid or solid substance that has a substantial vapor pressure. The vapor absorption encourages the refrigerant to evaporate further, thus generating a cooling of the refrigerant. The desiccant's absorption of vapor is generally exothermic, which has the effect of heating the desiccant. This effect can be used to generate a cooling effect, a heating effect, or both.

By 1810, a process utilizing sulfuric acid to cool water had been developed. This process worked by absorbing water vapor contained in a closed evacuated chamber when both water and sulfuric acid were separately contained within the same chamber. This conventional process results in evaporation of vapor from a pool of water, eventually generating ice at the surface of the water. By 1859, water and ammonia were utilized together for a similar effect, and by 1860, this thermal transfer process was patented. This classical invention for thermal transfer from the 19$^{th}$ century enabled the development of an ice-making industry and refrigerated food storage in modern civilization.

During the 1950's, lithium bromide (LiBr) was introduced in the absorption refrigeration industry, as it had several advantages over the ammonia/water cycle. Advantages included non-volatility of LiBr and the ability to pump the solution with liquid pumps rather than gas pumps. By 1956, double stage LiBr-based absorption refrigerators had been developed. Today, multiple-stage absorption refrigerators have been developed by utilizing the same design principle used in the double stage design from the 1950's.

In all conventional cases described above, a low temperature liquid or solid refrigerant generates a vapor, which is absorbed by a desiccant at another temperature. Several conventional devices may be able to utilize the cool refrigerant in the absorption of heat from another source, such as a stream of air passing through a room, duct, or other enclosed area. This is used for air conditioning or refrigeration. Once the desiccant is at least partially saturated with absorbed refrigerant, the desiccant generally becomes unusable. As a result, the desiccant must be regenerated, or separated from the refrigerant. As all conventional refrigeration devices utilize a closed system, they necessitate a heat transfer into the system, which drives the refrigerant from the desiccant. The heat carried away with the refrigerant is then rejected, enabling the refrigerant to recondense and be used again.

At least one device described in U.S. Pat. No. 4,227,375 utilizes the heat generated from the absorption of vapor as a method of obtaining thermal energy. This is a form of chemical energy obtained by the adsorption of water by the desiccant. Storage of the dry desiccant enables the device described by U.S. Pat. No. 4,227,375 to effectively store energy in a convenient and stable form.

An important aspect of the absorption-style refrigeration is that the cooling obtained is a non-equilibrium process. The cooling is obtained when the vaporized refrigerant is absorbed, thus generating vaporization of more liquid or solid refrigerant. In absorption refrigerators, the latent and enthalpy-associated heat is rejected to an intermediate-temperature reservoir, which enables a continual absorption of heat and vapor by the desiccant. As a result, the system is typically operated out of chemical and thermodynamic equilibrium. This ensures rapid heat transfer and maximal cooling.

The need to simultaneously keep the desiccant active and to operate at low temperatures requires the cool and concentrated desiccant to be continually pumped into the absorption chamber in practice. Furthermore, it is also necessary to continually pump the warmer dilute desiccant into the regenerator. Because the desiccant is a very hygroscopic substance, a much higher temperature heat than the intermediate temperature (i.e. at which the heat is rejected) must be utilized to vaporize the refrigerant either absorbed or adsorbed by the desiccant. Therefore, the absorption refrigeration system typically includes at least three different temperature regimes.

In addition, as mentioned previously, there are absorption refrigerators that utilize multiple stages. One such device is disclosed in U.S. Pat. No. 8,783,053. These multi-stage devices utilize high temperature heat sources, much like single stage devices. The heat rejected from the regenerator of the first stage is used to drive a second stage regenerator. This results in a lower thermal input and a higher coefficient of performance (COP) value. However, the addition of the second stage or any subsequent stages increases the system complexity, as the multiple stages need to be operated at differing operational pressures.

The conventional multiple stage designs are used to drive the desiccant used in the absorption to a continually lower water content, thereby enabling both quicker thermal transfers and more effective cooling. However, the conventional multiple stage designs are not able to increase the overall thermal gradient between the desiccant and the refrigerant as a linear or superlinear function of the number of stages. Therefore, the maximal thermal gradient is still limited to that generated between a completely dry desiccant or desiccant solution and the refrigerant in a completely closed container filled only with vaporized refrigerant.

In 2010, the inventor of the present invention, Dr. Sanza T. Kazadi, and other researchers disclosed a design for a cooling device based on an innovative entrochemical cell. The entrochemical cell has some similar physical characteristics to the absorption refrigerator. Each entrochemical comprises two closed chambers in vapor communication with one-another, and are arranged in a manner to ensure that the combined system is hermetically sealed in operation. Preferably, one chamber contains a desiccant while the other chamber contains a refrigerant.

However, unlike the absorption refrigerator, the entrochemical cell is operated at or near chemical and thermodynamic equilibrium. The two solutions contained by the entrochemical cell can only obtain chemical equilibrium when their temperatures are different. As a result, the two chambers settle to different temperatures. In an efficiently-insulated entrochemical cell, the temperature gradient may be maintained for days or weeks.

The table below demonstrates equilibrium thermal gradients in an entrochemical cell when one cell contains distilled water and the other contains a saturated solution of the indicated salt or salt combination.

| Solute | $\Delta T \, °C. \, (\pm 0.5° \, C.)$ |
|---|---|
| NaCl | 3 |
| MgSO$_4$ | 1 |
| NaCl + MgSO$_4$ | 4 |
| KNO$_3$ | 1.5 |
| KNO$_3$ + NaCl | 4 |
| NaNO$_3$ | 5 |
| KCl | 1.5 |
| NaNO$_3$ + KCl | 7 |

In the table above, the thermal gradient between an entrochemical cell's chambers at equilibrium is shown, when a first chamber is filled with distilled water and a second chamber is filled with the indicated salt or salt combination.

These experiments, documented by Kazadi et. al., involved placing a water/salt solution in the first chamber and distilled water in the second chamber, and then measuring the temperature after the system comes to equilibrium. It was demonstrated that, when the entrochemical cell was evacuated in order to generate a rarified atmosphere near the vapor pressure of the liquid inside, the two water solutions generated a thermal gradient that could be sustained for hours to weeks if properly insulated. Moreover, if the resulting dilute salt solutions are removed from the chambers, they can be dried in air and reused. While this last property may be quite appealing in some cases, as it eliminates the need for a regenerator using high temperature heat, the thermal lift of the various solutions remains undesirably low.

When operated at or near chemical equilibrium, a single absorption cell responds to perturbations or thermal leakage, which tends to bring the refrigerant and desiccant temperatures closer to one-another, by evaporation of the refrigerant and absorption of vapor by the desiccant. The evaporation process can be quite energetic, generating winds with speed of several miles per hour inside the cell, depending on the particular geometry of the cell. As a result of this evaporation, the amount of leakage or perturbation a cell can effectively respond to is limited. The refrigerant is eventually exhausted and must be replaced. In a conventional closed system, this is accomplished using a regenerator. In an open system, this is accomplished by simply adding more refrigerant.

Much of the present research on absorption refrigerators is focused on generating new chemical compounds that can function in the refrigerator while avoiding problems such as crystallization, clogging, or corroding the mechanical parts of the device, etc. This is necessary because of the dual problem of finding a desiccant that can be regenerated at low temperature and can simultaneously enable a large thermal gradient. However, if the design enabled the individual cells to reject heat into one another to make the warmer part of one cell in its chemical equilibrium state with differing chamber temperatures identical in temperature to the colder chamber of the next cell, the overall thermal gradient may be increased dramatically. Conventional absorption refrigerators have not been able to achieve such desirable characteristics. Therefore, an innovative design that enables the use of much less chemically active desiccants that are commonly available and inexpensive, such as NaCl, may be highly desirable.

Kazadi et. al. has previously disclosed a two-stage device in which a NaCl plus water solution was used in a first chamber and a distilled water solution was used in a second chamber. While this design seemed to provide superlinear performance with a one-chamber thermal lift of 2.5° C. and a two-chamber thermal lift of 5.7° C., the design could not be extended to three stages. Moreover the design did not employ the nested heat transfer system of the present invention.

When the refrigerant condenses in or on the desiccant, the desiccant surface becomes covered with water. This can have the effect of shielding the interior of the desiccant from additional water absorption or adsorption. As a result, when working with pooled liquid desiccants, it is necessary to mix the desiccant to restore the desiccant concentration at the surface of the water. This can be accomplished by a variety of means, including adding a physical mixer, sloshing the cell, or utilizing the thermal energy in the vapor flow between the two chambers to drive a mechanical mixing system. This functionality has not been previously disclosed due to the vastly different nature of conventional absorption refrigerator design.

Therefore, an objective of an embodiment of the invention is to devise an absorption refrigeration device which operates in chemical equilibrium and can additively combine the thermal lift of multiple cells with independent desiccant and refrigerant equilibria, enabling the use of many different desiccants with limited thermal gradients and associated thermodynamic properties.

In conventional LiBr type absorption refrigerators, both the desiccant and the refrigerant are sprayed into a chamber using atomizers or similar systems for creating very small droplets. This increases the surface area, enabling quicker absorption of water vapor by the desiccant and evaporation of water from the refrigerant droplets. However, this requires the use of at least two fluid pumps and two atomizers. These additional elements add to the complexity of the absorption refrigerator. Therefore, another objective of an embodiment of the invention is to devise a novel device that reduces design complexity exhibited in conventional absorption refrigerator designs, while providing a good desorption and absorption efficiency.

Furthermore, another objective of an embodiment of the invention is to provide a novel device that utilizes an absorption and desorption process between a desiccant and a refrigerant that functions to establish, maintain, and return to a chemical equilibrium state, consequently creating and maintaining a thermal gradient. In addition, another objective of an embodiment of the invention is to provide a novel device that allows a plurality of individual cells to perform their absorption and desorption independently to achieve an overall thermal gradient greater than that of an absorption and desorption reaction within a single cell, thereby enabling an expansion of the range of desiccants available for absorption refrigeration and related thermal processes.

Moreover, another objective of an embodiment of the invention is to provide a system that accommodates an additive use of a desiccant for achieving a substantially larger thermal gradient than that of a single stage device, and does not require water pumps, atomizers, or other tools to provide sufficient interaction between the water vapor and either the desiccant or the refrigerant. Furthermore, another objective of an embodiment of the invention is to provide a mixing method required to achieve a high performance for the entrochemical cell. In addition, another objective of the invention is to increase the effective surface area interface between the vapor and the desiccant.

Furthermore, an additional objective of an embodiment of the invention is to provide a novel process for obtaining work from environmental thermal energy. Moreover, an additional objective of an embodiment of the invention is to provide a novel entrochemical energy transfer system that utilizes the novel process for obtaining work from the environmental thermal energy.

In one embodiment of the invention, an apparatus capable of amplifying the cooling and/or heating effect of a single stage of desiccant-mediated thermal transfer is disclosed. This apparatus comprises multiple individual entrochemical cells. Each cell further comprises two chambers connected by a conduit, which enables vapor to travel naturally between the two chambers. Furthermore, each chamber has at least one opening, sealed by at least one valve, through which solution can be deposited in the chamber. The entire apparatus is hermetically sealed so that a rarified atmosphere can be created and maintained within. In a preferred embodiment of the invention, a first chamber containing the more concentrated solution is designated as "Chamber 1," and a second chamber containing the less concentrated solution is designated as "Chamber 2."

For drawing element labeling purposes, the first digit in each drawing element label signifies an entrochemical cell number. For example, in FIG. 1, the first digit "1," in each of the drawing element labels (e.g. 11, 12, 13, 14, 15, 16) signifies that a particular drawing element is part of the first entrochemical cell, or "Cell 1." Because FIG. 1 only shows one entrochemical cell (i.e. Cell 1), the first digit in each drawing element label is "1." In another example, in FIG. 2, there are two entrochemical cells (i.e. Cell 1, Cell 2) with one chamber from each entrochemical cell forming a nested structure. Therefore, some drawing element labels in FIG. 2 have the first digit as "1," while other drawing element labels have the first digit as "2."

Figure 3:
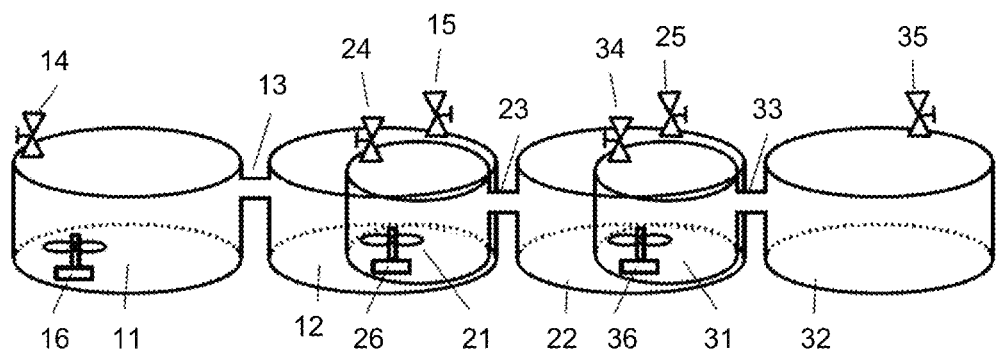
FIG. 3 shows three enhanced entrochemical cells with two pairs of nested chambers, in accordance with an embodiment of the invention.

Likewise, in case of FIG. 3, there are three entrochemical cells (i.e. Cell 1, Cell 2, Cell 3) with two nested structures, wherein the first nested structure is between Cell 1 and Cell 2, and the second nested structure is between Cell 2 and Cell 3. Therefore, some drawing element labels in FIG. 3 have the first digit as "1," while other drawing element labels have the first digit as "2" or "3." Similarly, in case of FIG. 4, there are n-number of entrochemical cells (i.e. Cell 1, Cell 2, Cell 3, . . . , Cell n) with "n–1" number of nested structures (i.e. Nested Structure 1, Nested Structure 2, . . . , Nested Structure (n–1)), wherein Nested Structure 1 is between Cell 1 and Cell 2, Nested Structure 2 is between Cell 2 and Cell 3, and Nested Structure (n–1) is between Cell (n–1) and Cell n. Therefore, some drawing element labels in FIG. 4 have the first digit as "1," or "2," while other drawing element labels have the first digit as "n–1," or "n."

Figure 2:
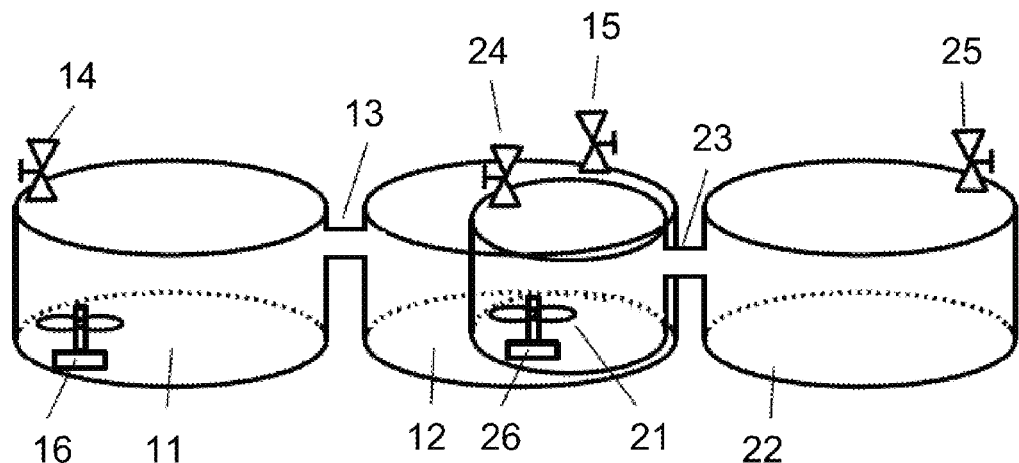
FIG. 2 shows two enhanced entrochemical cells with a pair of nested chambers, in accordance with an embodiment of the invention.
Figure 4:
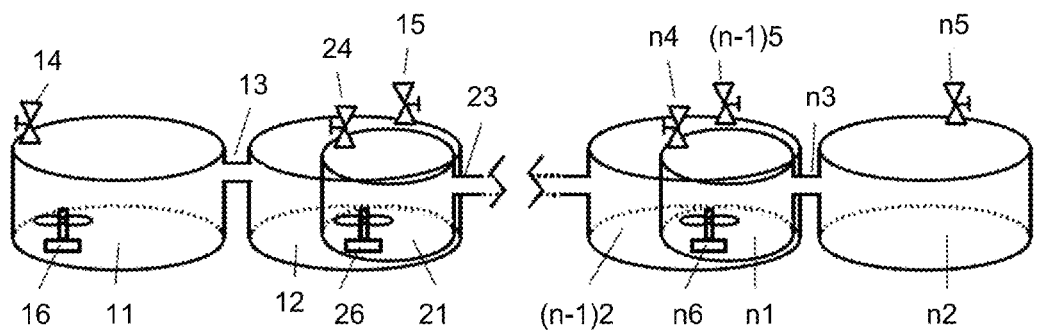
FIG. 4 shows an n-cell long array of nested enhanced entrochemical cells, in accordance with an embodiment of the invention.

As shown in FIGS. 2-4, in the preferred embodiment of the invention, each entrochemical cell is uniquely arranged so that nested structures are formed by two adjacent entrochemical cells by at least partially encapsulating a smaller chamber from one of the two adjacent entrochemical cells by a larger chamber from the other of the two adjacent entrochemical cells. Each nested structure is in thermal communication using a thermally conductive material. In this way, the entrochemical cells are arranged linearly and the temperature of Chamber 2 (i.e. lower concentration solution chamber) of one cell is significantly close to the temperature of Chamber 1 (i.e. higher concentration solution chamber) of the next cell. Therefore, if the temperature gradient of one cell is ΔT (t), where it is understood that the temperature gradient of each cell is itself temperature dependent, the overall temperature gradient of the total unit is $$\Delta T_{total} = \sum_{i=1}^{n} \Delta T(t_i)$$

Furthermore, in the preferred embodiment of the invention, each entrochemical cell may be enhanced for higher efficiency and performance. For example, Chamber 1 of each entrochemical cell is equipped with a method of mixing the solution. This enables the absorbed vapor, which tends to pool at the top of the solution, to fully mix in the desiccant-solution.

The novel nested heat transfer system, as disclosed in various embodiments of the present invention, shares some similarities with conventional absorption refrigeration, but also exhibits significant differences. In both technologies, the operational physical quality is the deliquescence of the draw solution that tends to absorb the refrigerant. However, in conventional absorption refrigeration, the system is operated to maximize the ability of the desiccant solution to absorb water. As a result, in conventional absorption refrigeration, the desiccant either becomes warm, which generates a heating effect, or the refrigerant becomes cold, which generates a cooling effect, or both. The heating effect is caused by the exothermic nature of the chemical reaction that occurs when a desiccant adsorbs the water. The cooling effect is caused by the cooling of the liquid that occurs as a result of the vaporization of the refrigerant. Conventional absorption refrigeration does not ever teach that the equilibrium state generates a usable thermal gradient, a notion that is uniquely and cleverly utilized in various embodiments of the present invention. Instead of building structures to maintain a system as far out of equilibrium as possible to cool or heat as quickly as possible, which are commonly practiced in conventional systems, entrochemical systems disclosed in various embodiments of the present invention incorporate elegantly minimal structures, such as two pools of liquid held at their entropic equilibrium point, which generates a departure from thermal equilibrium.

Because liquid solutions are maintained as closely as possible to entropic equilibrium despite thermal leakage in the nested thermal transfer system of the present invention, such a simplified and unique structural design is possible. In contrast, conventional refrigeration systems require more complexity because they require keeping solutions out of equilibrium, thus necessitating work done on the solutions to prevent the conventional refrigeration systems from reaching an equilibrium. For instance, in conventional absorption refrigerators, three operational temperatures are typically required. The first operational temperature is a colder temperature of the refrigerant, the second operational temperature is the room temperature, at which the heat generated by adsorption of water is rejected, and the third operational temperature is a hotter temperature, at which the absorbent is regenerated and separates water from it. These conventional refrigeration systems require a constant influx of thermal energy to maintain the high temperature and a separate heat sink at room temperature to maintain the middle temperature.

In contrast, utilizing a system at equilibrium requires only two operational temperatures in various embodiments of the present invention: a colder operating temperature, and a hotter operating temperature. Moreover, a nested heat transfer system in accordance with an embodiment of the present invention is capable of maintaining the thermal gradient without an influx of any thermal energy. The thermal energy can be moved spontaneously from one part to another part of the nested heat transfer system. Furthermore, the only energy required to maintain this equilibrium point is mechanical energy used to mix the higher absorbent solution, and this mechanical energy can be derived from the dynamics of the thermal energy transfer from one part to another, as further described in detail below.

Conventional absorption refrigeration typically lacks multiple-stage systems that operationally connect a lower-temperature refrigerant to a hotter desiccant in a second stage. Instead, conventional multiple-stage systems are merely designed to enhance the regeneration of the desiccant by running the same thermal energy that drives the regeneration through multiple stages, thus generating a new yield at each stage. The conventional multi-stage refrigeration systems are therefore fundamentally different from the present invention's direct thermal connection between the cooler refrigerant and the hotter desiccant, because the conventional multi-stage refrigeration systems do not increase the overall thermal gradient. Rather, the conventional multi-stage refrigeration systems extend the possible thermal gradient in a single stage to its maximum capability, when a completely dry desiccant and the refrigerant are utilized.

In contrast, the stacking method in accordance with an embodiment of the invention, which is further described below, is capable of extending the cooling or heating process well beyond the single stage limit and is capable of utilizing multiple desiccants and refrigerants, as each entrochemical cell is independent and hermetically sealed from each other. This novel and unique ability to expand the thermal gradient and capacity makes the nested entrochemical thermal transfer system of the present invention capable of cooling to much colder temperatures than conventional absorption refrigerators. Similarly, the scalable and expandable thermal gradient and capacity of the nested entrochemical thermal transfer system of the present invention enable heating to much hotter temperatures than conventional absorption refrigerators.

For example, an entrochemical cell-nested thermal transfer system with $CaCl_2/H_2O$ refrigerant and absorbent solutions, in accordance with an embodiment of the invention, has shown in laboratory measurements of thermal gradients in excess of their approximate single stage limit of 13° C., with temperatures as high as 30° C. It is equally feasible to provide cooling of as much as 120° C. and heating with a great thermal lift, with desiccants such as LiBr or $ZnCl_2$. Conventional absorption refrigerators are unable to provide such a large thermal lift.

One aspect of an embodiment of the present invention is partially or completely embedding (i.e. "nesting") a higher temperature chamber of an entrochemical cell in a lower temperature chamber of an adjacent entrochemical cell, or vice versa, to transfer thermal energy between the two nested chambers at high (i.e. near-maximum possible) efficiency. Thermal energy losses are nearly nonexistent or minimal in this nested chamber structure involving at least two entrochemical cells, because heat is directly transferred from one chamber to the next within the hermetically-sealed nested structure. Furthermore, the nested structure of chambers may be configured to maximize contact surface area, which optimizes the rate of energy transfer and the work done within the nested heat transfer system.

In one embodiment of the invention, the novel inclusion of a mixing apparatus is important for an efficient transfer of energy from one entrochemical cell to an adjacent entrochemical cell. Without this mixing apparatus, a film of lower concentration liquid can form on the surface of the high chemical activity solution. As thermal energy is transferred due to the difference in liquid concentrations at the contacting surface of the nested chambers, the formation of the lower concentration liquid film may inhibit thermal transfer. The mixing apparatus prevents or breaks up the lower concentration liquid film by agitating the desiccant, especially near the contacting surface of the nested chambers, thus protecting or restoring the thermal energy transfer capacity. The mixing apparatus may be incorporated inside a chamber as an internal unit, or may be designed as an external unit to shake or vibrate the entire chamber structure.

In a preferred embodiment of the invention, an elegantly simple mixing apparatus comprises a magnetic mixing bar contained inside Chamber 1 (i.e. higher concentration solution chamber) of each entrochemical cell, and an externally-located magnetic mixing unit in each entrochemical cell. As the externally-located magnetic mixing unit spins its magnet to change magnetic fields, the magnetic mixing bar inside Chamber 1 correspondingly spins, thus mixing the internal solution in Chamber 1.

In another embodiment of the invention, another type of mixing apparatus is an external unit that can shake or agitate one or more chambers in the nested structure to induce a sloshing movement of the liquids contained in the chambers. The external unit-induced sloshing movement provides efficient mixture and homogenization of each solution, thus restoring thermal transfer characteristics that may have been reduced or distorted due to the undesirable film formation.

Yet in another embodiment of the invention, another type of mixing apparatus utilizes the transfer of thermal energy between chambers to mix the higher concentration solution. As the two solutions of different concentrations have differing equilibrium vapor pressures, the two chambers react to perturbations in the vapor pressure differently. The higher concentration solution tends to absorb excess vapor, while the lower concentration solution tends to generate new vapor when the vapor pressure drops. This imbalance in pressures between the chambers drives the vapor from Chamber 2 (i.e. lower concentration solution chamber) to Chamber 1 (i.e. higher concentration solution chamber). If the vapor pathway from Chamber 2 to Chamber 1 is terminated by a vertical tube, wherein the vertical tube is connected to Chamber 1's opening that enables vapor entry into Chamber 1 and a termination point of the vapor pathway is located under the water level of the solution in Chamber 1, the vapor will generate bubbles that percolate through the higher concentration solution. The movement of the bubbles encourages mixing of the solution in Chamber 1.

Another aspect of an embodiment of the present invention is an increase in the effective surface area of the interface between a refrigerant and a desiccant with unique methods and devices. Methods utilized in conventional absorption refrigeration include atomized streams of fluid in the absorption chamber, which generate a very large surface area, and the application of very small solid desiccant spheroids, which create large surface areas. The utilization of very small solid desiccant spheroids requires a secondary pumping apparatus and/or another apparatus to move heat efficiently from solid desiccants. Mixing the solution with bubbles solves this surface area problem by directly injecting vapors into the desiccant, wherein the vapors can be partially or completely absorbed by the desiccant as they move upward. Preferably, the bubbling is processed as quickly as possible because the desiccant can absorb the vapor, and the timely mixing ensures a constant concentration of the solution.

The nested heat transfer system in accordance with an embodiment of the present invention enables the utilization of a much wider range of potential desiccants than what is feasible in conventional thermal energy transfer systems. Typically, conventional absorption-based thermal energy transfer systems are limited by their choices of desiccants. Only desiccants having a very high chemical activity can be practically used for domestic, commercial, or industrial tasks in conventional systems. In contrast, by creating a scalable thermal transfer system capable of linearly adding multiple independent entrochemical cells with nesting of chambers, the present invention can utilize a wide range of desiccants, including commonly-available and inexpensive desiccant materials.

Furthermore, in some embodiments of the invention, valves can be strategically positioned to allow liquid and vapor to flow into and out of both ends of each chamber, and also allow independent insertion of liquid directly into and independent removal of liquid directly out of each chamber in each entrochemical cell. In addition, vacuum can be applied in one end of a chain of entrochemical cells to allow easy removal of existing gas from the nested heat transfer system, as new gas is injected in the other end of the chain of entrochemical cells. The utilization of such valves and vacuum enables the nested heat transfer system to be maintained in a piecewise fashion, rather than requiring all maintenance to be completed on all parts of the system simultaneously. As a case in point, in one example, two parallel nested heat transfer systems can be operated without functional interruptions, even as liquids are recycled or vacuum is applied to a single entrochemical cell. Such an advantageous continuity of system operation is not realistically feasible with a conventional absorption refrigerator, unless substantial design complexities are introduced to the conventional absorption refrigerator.

Furthermore, in a preferred embodiment of the invention, the acquisition of environmental thermal energy for the purposes of doing useful work is accomplished by entropy transfers that involve thermal transfers. In the preferred embodiment, these entropy transfers are accomplished using a novel two-stage process. In step one, entropy is transferred out of a desiccant solution using an evaporative process that does not require an addition of heat to the air stream. One example is passing untreated air over the desiccant solution. This process transfers water out of the desiccant solution, thus increasing the overall entropy and drying out the desiccant solution. This process is feasible with desiccants of low chemical activity. Desiccants with high chemical activity, such as LiBr or $ZnCl_2$, are unlikely to release absorbed water spontaneously. For such high chemical activity desiccants, the regeneration is ineffective.

In step two, the desiccation is utilized in a linear entrochemical array to develop a thermal gradient. Each entrochemical cell is loaded with a highly-concentrated desiccant solution, a less concentrated solution, or water. In each entrochemical cell, liquid water vaporizes from the second chamber and recondenses in the first chamber, thus transferring thermal energy and increasing entropy. The process of generating a thermal gradient is therefore spontaneous.

There are three primary ways to utilize the thermal gradient for performing useful work. First, the thermally-hotter end of the entrochemical cell can be used to provide heat to an unheated device for a secondary process. Second, the thermally-cold end of the entrochemical cell can be used to provide a heat sink for the absorption of thermal energy. Third, the thermally-cold end can be used to absorb heat from one end of a device and to transfer the heat to another end of the same device in order to do work (i.e. as with a distiller). The thermal gradient can enable the reuse of thermal energy traveling through the system, thus limiting the need for high temperature input in order to develop thermal processes of high energy efficiency.

One or more embodiments of the present invention disclose an open-system process that utilizes entropy transfers to enable the movement of liquid through the open system for energy transfers, thus generating thermal gradients that can be used to do work. The novel energy transfer system disclosed in one or more embodiments of the present invention relies on energy available in the environment and the natural day and night thermal transfer cycle of our planet, which releases environmental entropy nightly and increases environmental entropy daily. Because the process is driven by work provided by the environment and the natural day and night cycles of our planet, the novel energy transfer system, which utilizes the novel structure of entrochemical cells and the natural thermal cycle of our planet, enables productive work for human needs. Furthermore, utilizing this process for the novel energy transfer system can be considered a net source of energy.

FIG. 1 shows a single enhanced entrochemical cell (100), in accordance with an embodiment of the invention. The single enhanced entrochemical cell (100), as shown in FIG. 1, comprises a first chamber (11) and a second chamber (12) connected by a conduit (13). The first chamber (11) is "Chamber 1" that holds absorbent solution, and the second chamber (12) is "Chamber 2" that holds solvent, which may be less chemically active and/or less concentrated than the absorbent solution. As shown in FIG. 1, in one embodiment of the invention, a mixing apparatus (16) is also incorporated in the first chamber (11) and is configured to agitate the absorbent solution to maintain the uniformity of its higher concentration mixture.

Furthermore, in this embodiment of the invention, the single enhanced entrochemical cell (100) also incorporates a first valve (14) attached to a top surface of the first chamber (11), and a second valve (15) attached to a top surface of the second chamber (12). Liquid solutions can be inserted into or removed from each chamber through these valves (14, 15). When a vacuum is applied through one of these valves (14, 15), the valves can be closed to maintain vacuum conditions within the single enhanced entrochemical cell (100).

FIG. 2 shows two enhanced entrochemical cells (200) with a nested chamber structure (12, 21). The first enhanced entrochemical cell includes the first chamber (11) and the second chamber (12), as previously explained in FIG. 1, and a second enhanced entrochemical cell includes its own first chamber (21) and its own second chamber (22), as shown in FIG. 2. Furthermore, the nested chamber structure (12, 21) in FIG. 2 comprises the second chamber (12), or "Chamber 2," of the first enhanced entrochemical cell, and the first chamber (21), or "Chamber 1," of the second enhanced entrochemical cell.

Preferably, the structure of each enhanced entrochemical cell is identical or nearly identical to each other, with a smaller chamber of an enhanced entrochemical cell embedded or encapsulated into a larger chamber of an adjacent enhanced entrochemical cell to form the nested chamber structure (12, 21), as shown in FIG. 2. The second enhanced entrochemical cell in FIG. 2 also has a conduit (23), which connects the first chamber (21) and the second chamber (22) of the second enhanced entrochemical cell.

Furthermore, as shown in FIG. 2, a first set of valves (14, 15) are attached to corresponding chambers in the first enhanced entrochemical cell, and a second set of valves (24, 25) are attached to corresponding chambers in the second enhanced entrochemical cell. In addition, in this embodiment of the invention, a first mixing apparatus (16) is included in the first chamber (i.e. Chamber 1) (11) of the first enhanced entrochemical cell, and a second mixing apparatus (26) is included in the first chamber (i.e. Chamber 1) (21) of the second enhanced entrochemical cell, as shown in FIG. 2.

FIG. 3 shows three enhanced entrochemical cells (300) with two nested chamber structures. As also shown previously in FIG. 1 and FIG. 2, the first enhanced entrochemical cell includes the first chamber (11) and the second chamber (12). Similarly, as also shown previously in FIG. 2, the second enhanced entrochemical cell includes its own first chamber (21) and its own second chamber (22). Likewise, the third enhanced entrochemical cell in FIG. 3 includes its own first chamber (31) and its own second chamber (32). As an illustration of "chainable" nested chamber structure, which is a novel and unique aspect of the present invention, FIG. 3 also shows the first nested chamber structure comprising the second chamber (12) of the first enhanced entrochemical cell and the first chamber (21) of the second enhanced entrochemical cell, and the second nested chamber structure comprising the second chamber (22) of the second enhanced entrochemical cell and the first chamber (31) of the third enhanced entrochemical cell.

Preferably, in the three enhanced entrochemical cells (300) shown in FIG. 3, the structure of each enhanced entrochemical cell is identical or nearly identical to each other, with a smaller chamber of an enhanced entrochemical cell embedded or encapsulated into a larger chamber of an adjacent enhanced entrochemical cell to form the two nested chamber structures. In this embodiment of the invention, the first nested chamber structure comprises the second chamber (12) of the first enhanced entrochemical cell and the first chamber (21) of the second enhanced entrochemical cell, and the second nested chamber structure comprises the second chamber (22) of the second enhanced entrochemical cell and the first chamber (31) of the third enhanced entrochemical cell.

Each enhanced entrochemical cell has a conduit between its two chambers (i.e. between Chamber 1 and Chamber 2 per cell). Therefore, three conduits (13, 23, 33) are illustrated in FIG. 3 for the three enhanced entrochemical cells (300), with each conduit connecting two internal chambers per enhanced entrochemical cell. Furthermore, as shown in FIG. 3, a first set of valves (14, 15) are attached to corresponding chambers in the first enhanced entrochemical cell. Likewise, a second set of valves (24, 25) are attached to corresponding chambers in the second enhanced entrochemical cell. Similarly, a third set of valves (34, 35) are attached to corresponding chambers in the third enhanced entrochemical cell.

In addition, in this embodiment of the invention, a first mixing apparatus (16) is included in the first chamber (i.e. Chamber 1) (11) of the first enhanced entrochemical cell. Likewise, a second mixing apparatus (26) is included in the first chamber (i.e. Chamber 1) (21) of the second enhanced entrochemical cell. Similarly, a third mixing apparatus (36) is included in the first chamber (i.e. Chamber 1) (31) of the third enhanced entrochemical cell, as shown in FIG. 3.

FIG. 4 shows an n-cell long array of nested enhanced entrochemical cells (400), in accordance with an embodiment of the invention. As also shown previously in FIG. 1 and FIG. 2, the first enhanced entrochemical cell includes the first chamber (11) and the second chamber (12). A multiple number of enhanced entrochemical cells can be chained in an array, up to an n-th number of entrochemical cell, which in turn involves up to "n−1" number of nested chamber structures formed by "n" number of enhanced entrochemical cells, as shown in FIG. 4. As evidenced by the n-cell long array of nested enhanced entrochemical cells (400), the nested heat transfer system in accordance with an embodiment of the present invention is uniquely modular and scalable, unlike conventional thermal transfer systems.

For example, if the total number of enhanced entrochemical cells is 10 (i.e. n=10), there are 9 nested chamber structures (i.e. n−1) formed in the chain of the enhanced entrochemical cells, with each nested chamber structure formed by encapsulating or embedding a smaller chamber of an enhanced entrochemical cell in a larger chamber of an adjacent enhanced entrochemical cell, as shown in FIG. 4.

Accordingly, in this embodiment of the invention, a last enhanced entrochemical cell comprising two chambers (n1, n2), and a conduit connecting them (n3) is also shown in FIG. 4. Chamber 1 of an enhanced entrochemical cell "n" (i.e. "n1") is largely or completely embedded within Chamber 2 of an adjacent enhanced entrochemical cell "n−1" (i.e. "(n−1)2"). Furthermore, as also shown in FIG. 4, valves are attached to Chamber 1 of cell n (i.e. "n4") and Chamber 2 of cell n (i.e. "n5"). In addition, a mixing apparatus (i.e. "n6") is embedded in Chamber 1 (i.e. "n1") of cell n.

Figure 5:
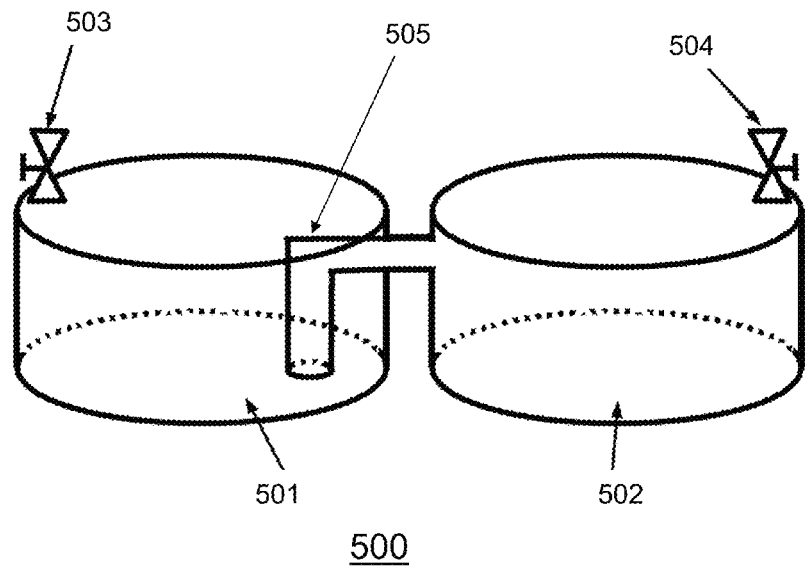
FIG. 5 shows a single enhanced entrochemical cell with a vertical tube that acts as a mixing apparatus, in accordance with an embodiment of the invention.

FIG. 5 shows a single enhanced entrochemical cell (500) with a vertical tube (505) that acts as a mixing apparatus, in accordance with an embodiment of the invention. In the embodiment of the invention as shown in FIG. 5, the single enhanced entrochemical cell (500), as shown in FIG. 5, comprises a first chamber (501) and a second chamber (502) connected by a conduit with the vertical tube (505). The first chamber (501) is "Chamber 1" that holds absorbent solution, and the second chamber (502) is "Chamber 2" that holds solvent, which may be less chemically active and/or less concentrated than the absorbent solution.

In this embodiment of the invention, the vertical tube (505) is connected to the first chamber (501) as a termination point of a vapor pathway between the first chamber (501) and the second chamber (502). The vertical tube (505) can function as a mixing apparatus, and is located lower than the surface level of the higher concentration solution in the first chamber (501) to generate bubbles that percolate through the higher concentration solution in the first chamber (501) for effective mixing and maintenance of concentration level.

Furthermore, in this embodiment of the invention, the single enhanced entrochemical cell (500) also incorporates a first valve (503) attached to the a top surface of the first chamber (501), and a second valve (504) attached to a top surface of the second chamber (502). Liquid solutions can be inserted into or removed from each chamber through these valves (503, 504). When a vacuum is applied through one of these valves (503, 504), the valves can be closed to maintain vacuum conditions within the single enhanced entrochemical cell (500).

Figure 6:
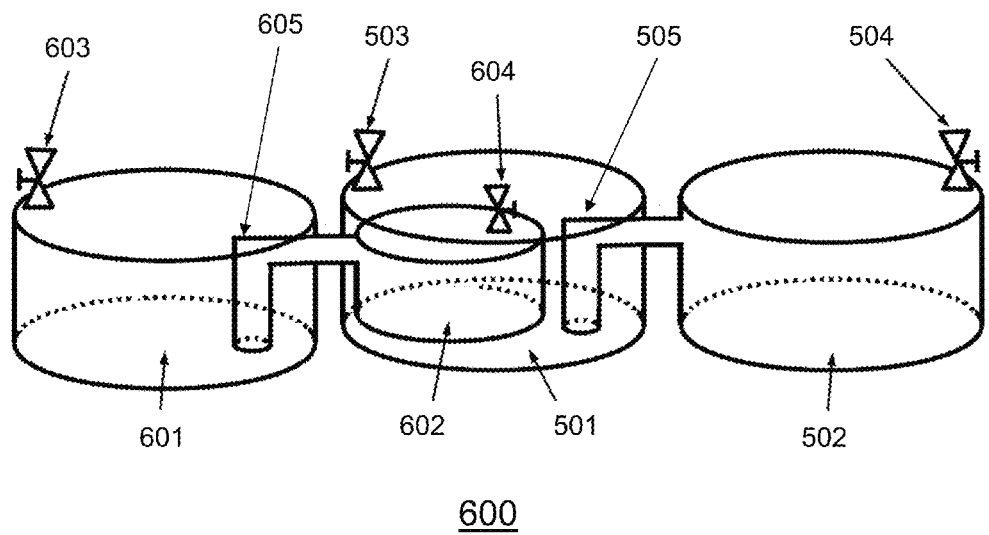
FIG. 6 shows two enhanced entrochemical cells with a pair of nested chambers and vertical tubes that act as mixing apparatuses, in accordance with an embodiment of the invention.

FIG. 6 shows two enhanced entrochemical cells (600) with a pair of nested chambers (602, 501) and vertical tubes (605, 505) that act as mixing apparatuses, in accordance with an embodiment of the invention. The first enhanced entrochemical cell includes the first chamber (501) and the second chamber (502), as previously explained in FIG. 5, and a second enhanced entrochemical cell includes its own first chamber (601) and its own second chamber (602), as shown in FIG. 6. Furthermore, the nested chamber structure (602, 501) in FIG. 6 comprises the second chamber (602), or "Chamber 2," of the second enhanced entrochemical cell, and the first chamber (501), or "Chamber 1," of the first enhanced entrochemical cell. Preferably, the structure of each enhanced entrochemical cell is identical or nearly identical to each other, with a smaller chamber of an enhanced entrochemical cell embedded or encapsulated into a larger chamber of an adjacent enhanced entrochemical cell to form the nested chamber structure (602, 501), as shown in FIG. 6.

In this embodiment of the invention, a first vertical tube (505) is connected to the first chamber (501) of the first enhanced entrochemical cell as a termination point of a vapor pathway between the first chamber (501) and the second chamber (502) of the first entrochemical cell. Similarly, a second vertical tube (605) is connected to the first chamber (601) of the second enhanced entrochemical cell as a termination point of a vapor pathway between the first chamber (601) and the second chamber (602) of the second entrochemical cell. Each vertical tube (505 or 605) can function as a mixing apparatus, and is located lower than the surface level of the higher concentration solution in each of the first chamber (501 or 601) to generate bubbles that percolate through the higher concentration solution in each of the first chamber (501 or 601) for effective mixing and maintenance of concentration level. Furthermore, as shown in FIG. 6, a first set of valves (503, 504) are attached to corresponding chambers in the first enhanced entrochemical cell, and a second set of valves (603, 604) are attached to corresponding chambers in the second enhanced entrochemical cell.

A preferred embodiment of the present invention further discloses a process for the acquisition of environmental thermal energy, which comprises two enabling entropy transfers. A first entropy transfer occurs between a water solution and the environment. A second entropy transfer occurs between two water solutions of differing concentrations in a closed container. The combination of the two transfers, each of which is spontaneous, enables the consequent capture of environmental thermal energy that can be utilized to perform work.

In the preferred embodiment of the invention, each step of the process for the acquisition of environmental thermal energy is individually spontaneous. In the first step of the process, water is spontaneously removed from a solution containing a non-volatile solute. This can be done directly via an evaporation process during which the solution containing the non-volatile solute is brought into contact with an air supply with a vapor content lower than the equilibrium vapor pressure of the solution.

Figure 11:
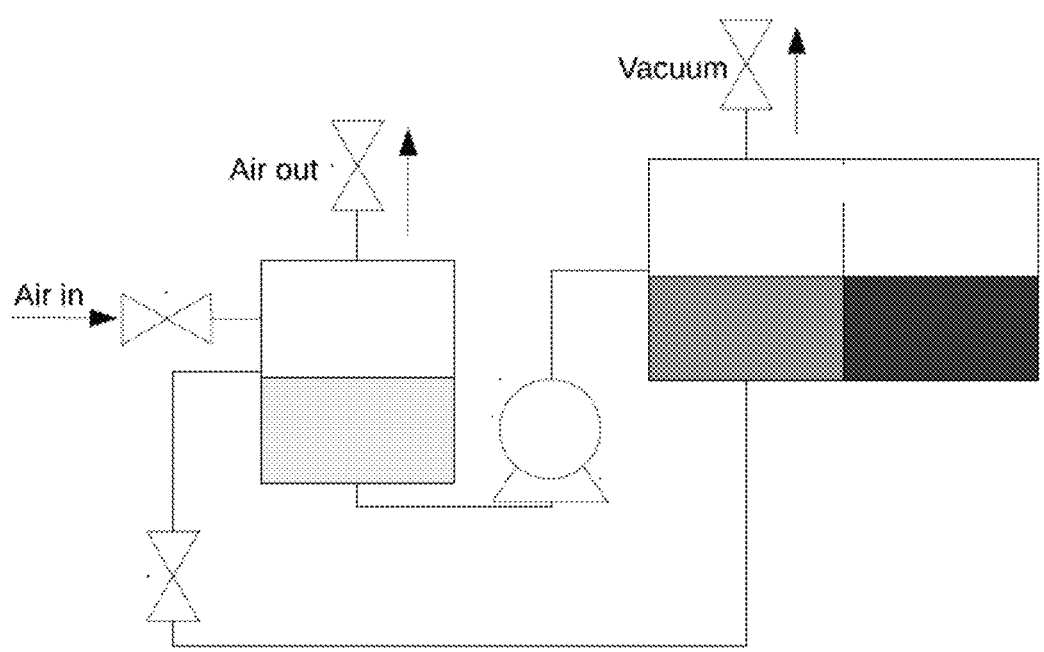
FIG. 11 shows an indirect process for evaporation of water contained in a dilute solution to create a usable concentrated solution, in accordance with an embodiment of the invention.

Evaporation of water contained in a dilute solution can also occur via an indirect process (1100), as shown in FIG. 11, to create a usable concentrated solution. The evaporation of water can also be achieved indirectly by a series of spontaneous water transfers between water solutions that differ in concentration. In such instances, the most concentrated solution is placed in direct contact with an air supply with a vapor content lower than the equilibrium vapor pressure of the solution. This makes the solution more concentrated. Water is subsequently moved to this solution from other less concentrated solutions through a process of spontaneous water transfers between solutions of differing concentrations. When these solutions are placed in chambers that share a thermally-conducting boundary and a vapor passage between the chambers, water is spontaneously moved from the lower concentration solution to the higher concentration solution.

In both cases of water evaporation, the water in contact with the air spontaneously evaporates, which increases the concentration of the solute contained within the solution. The evaporation of solvent transfers entropy to the air, and the entropy increases as a result of the evaporation. Moreover, in the indirect case of water evaporation, water transfers between solution pairs increase the systemic entropy at each step of transfer.

The contact between the air and the water is greatly enhanced when the air is circulated over the solution. While most methods of circulation require the input of energy derived from some forms of power generation, the air circulation can be enabled through the use of a solar chimney in a preferred embodiment of the invention.

A solar chimney is a device that utilizes direct solar energy to warm an enclosed column of air, which in turn increases the buoyancy of the enclosed column of air relative to the air outside the solar chimney. The warmed air is then channeled into a vertically-oriented tube, which accommodates the rising of the warmed air as a result of the increased buoyancy. The movement of the warmed air creates a low pressure in the solar chimney, thus enabling more air to enter the intake of the solar chimney. This process can continue throughout the day. The use of energy-storing structures, such as water-filled black plastic bags, can also assist the functionality of the solar chimney throughout the night. In real world applications, high rates of air movement volumes, such as 3.5 cubic kilometers per hour, have been reported in solar chimneys, thus indicating that a vast amount of air may be circulated in this manner without the need for a forced circulation using motors or engines.

In the second step of the process for the acquisition of environmental thermal energy, a transfer of entropy between the concentrated water solution and a less concentrated water solution occurs. The use of desiccant solutions in conjunction with solutions of lesser concentration of solute generates a sustainable thermal gradient between the desiccant solutions and less-concentrated solutions inside the single enhanced entrochemical cell (i.e. 100 of FIG. 1) that can utilize a wet vacuum, or a vacuum in which a majority of the air found in the chamber is solvent vapor. This thermal gradient occurs because the solvent in the less concentrated solution evaporates while an equal amount of the solvent vapor condenses on the higher concentration solution. This process continues as long as the concentration differential is maintained.

If the concentration of the lower concentration solution is zero, then the magnitude of the thermal gradient can be determined entirely by the saturation concentration of the salt solution. An empirical set of data is presented in the table below, with approximate measurements of thermal gradients for a variety of solutes. This table shows how differing salts and salt combinations yield differing equilibrium temperature gradients. The temperature gradients have roughly similar gradients vs. molarity values, with these averaging at 0.440±0.16° C.·L/mol.

| Solute | $\Delta T$ ° C. (±0.5° C.) | Solubility at 25° C. (M) | $\frac{\Delta T}{M}$ |
| --- | --- | --- | --- |
| NaCl | 3 | 6.14 | 0.489 ± 0.16 |
| $MgSO_4$ | 1 | 2.12 | 0.472 ± 0.23 |
| NaCl + $MgSO_4$ | 4 | 8.26 | 0.484 ± 0.12 |
| $KNO_3$ | 1.5 | 3.56 | 0.421 ± 0.28 |
| $KNO_3$ + NaCl | 4 | 9.70 | 0.412 ± 0.10 |
| $NaNO_3$ | 5 | 10.8 | 0.463 ± 0.09 |
| KCl | 1.5 | 4.61 | 0.325 ± 0.21 |
| $NaNO_3$ + KCl | 7 | 15.4 | 0.455 ± 0.06 |

The data presented in the table above are in agreement with a theoretical value of 0.52 $\Delta T/M$ for the increased temperature of the boiling point of water due to the presence of a soluble salt. Therefore, it is clear that two solutions of water can generate a thermal gradient, which can be sustained as long as the concentration gradient is maintained.

When utilizing two enhanced entrochemical cells (i.e. 200 of FIG. 2) with a nested chamber structure (i.e. 12, 21 of FIG. 2), the effect on the thermal gradients may be substantially amplified. Each enhanced entrochemical cell independently generates its own thermal gradient, and the nested chamber structure enables the warmer part of one enhanced entrochemical cell to have the same temperature as the cooler part of an adjacent entrochemical cell. As a result, the two temperature gradients are additively related. The magnitude of the vapor pressure difference between a salt solution and a less concentrated solution is related to the temperature. The vapor pressure difference increases with the increasing temperature, which in turn also increases the thermal gradient. Therefore, the temperature gradient increases super-linearly (i.e. generally greater than a typical linear increase), as shown in the table below. This table shows an example of how linking multiple entrochemical cells that incorporate novel nested chamber structures can increase the overall thermal gradient super-linearly for the thermal transfer system:

| Solute | ΔT ° C. (1 cell) | ΔT ° C. (2 cells) |
|--------|------------------|-------------------|
| NaCl   | 2.5              | 5.7               |
| CaCl₂  | 6                | 14                |

Although the super-linear effect on the overall thermal gradient of the nested chamber entrochemical cells for a thermal transfer system is illustrated only for NaCl and CaCl₂ in the table above, similar super-linear effects on the overall thermal gradient also occur in water solutions generated from a variety of solutes.

The second step of the process for the acquisition of the environmental thermal energy utilizes a linear entrochemical array constructed of a plurality of individual cells with nested chambers, as exemplified by the n-cell long array of nested enhanced entrochemical cells (i.e. 400 of FIG. 4). By placing differing concentrations of solutions in the individual chambers of each enhanced entrochemical cell, a large thermal gradient can be developed in the entrochemical device, or in another thermal transfer system utilizing the nested structure of the entrochemical cells. This thermal gradient can be utilized to absorb energy from the environment, drive energy to the environment, or both.

Figure 7:
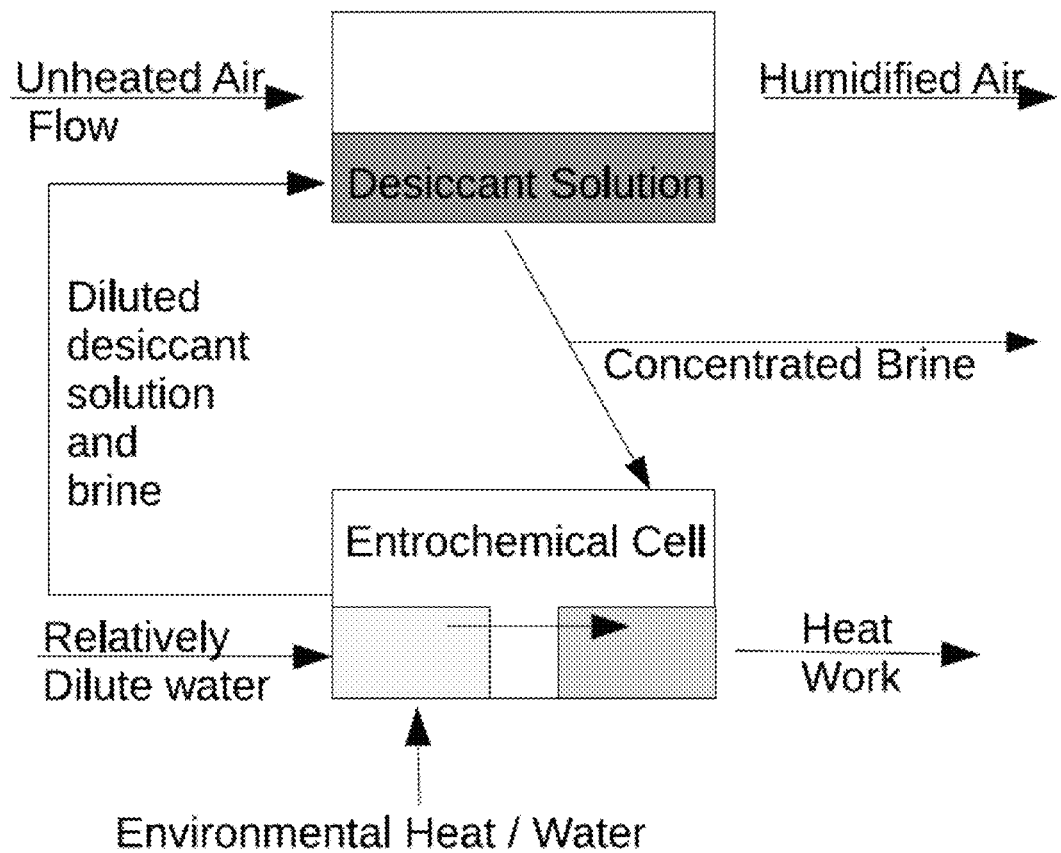
FIG. 7 shows a schematic flow diagram illustrating a process of entropy transfer that enable the acquisition of environmental thermal energy, in accordance with an embodiment of the invention.

FIG. 7 shows a schematic flow diagram (700) illustrating a set of entropy transfer that enable the acquisition of environmental thermal energy in a novel energy transfer system, in accordance with an embodiment of the invention. The combined effect on the energy transfer system, as shown in the schematic flow diagram (700), enables the utilization of environmental thermal energy to prepare and apply the high concentration solution to drive the development of a thermal gradient, which absorbs heat from the environment and/or pushes heat into the environment. Thus, the energy transfer system that includes novel nested chamber structures for a plurality of entrochemical cells are able to generate a scalable and large overall thermal gradient through an extraction of environmental thermal energy and the subsequent use of that energy to do work. The amount of heat moved is at most proportional to the amount of water used. In particular, the total water volume required to move J Joules is given by $$V \geq \frac{Jn}{H_v}$$

where $H_v$=2.246 kJ/mL and n is the number of stages in the entrochemical device.

Figure 8:
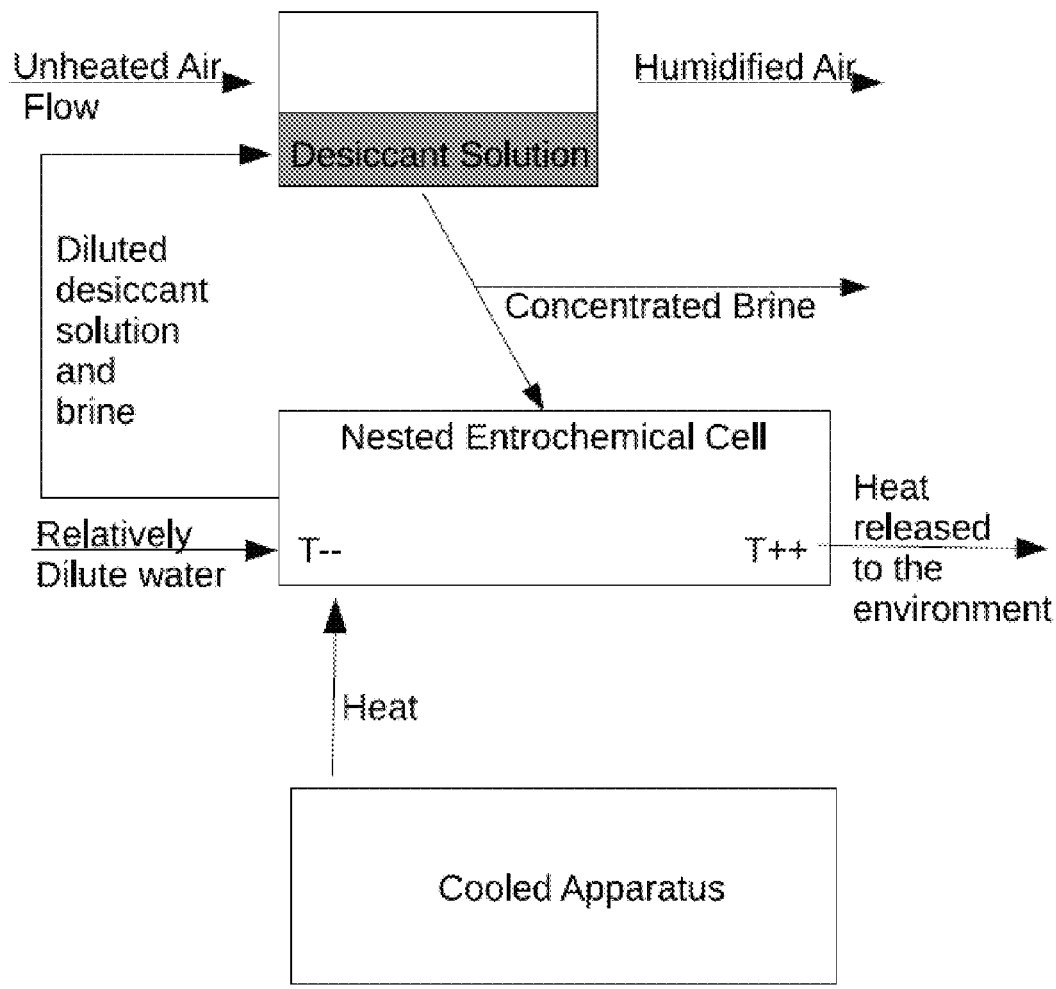
FIG. 8 shows a schematic flow diagram illustrating a process of entropy transfers that enables the acquisition of thermal energy from a closed container and the emission into the environment, in accordance with an embodiment of the invention.

In one or more embodiments of the invention, the process for the acquisition of environmental thermal energy may involve three modes of usage. The first mode of usage is disclosed in a schematic flow diagram (800) of the energy transfer system, as shown in FIG. 8. In the first mode of usage, heat is absorbed from a closed system and is discharged into the environment. This first mode of usage may be utilized in environmentally-friendly refrigeration, air conditioning, and/or active system cooling.

Figure 9:
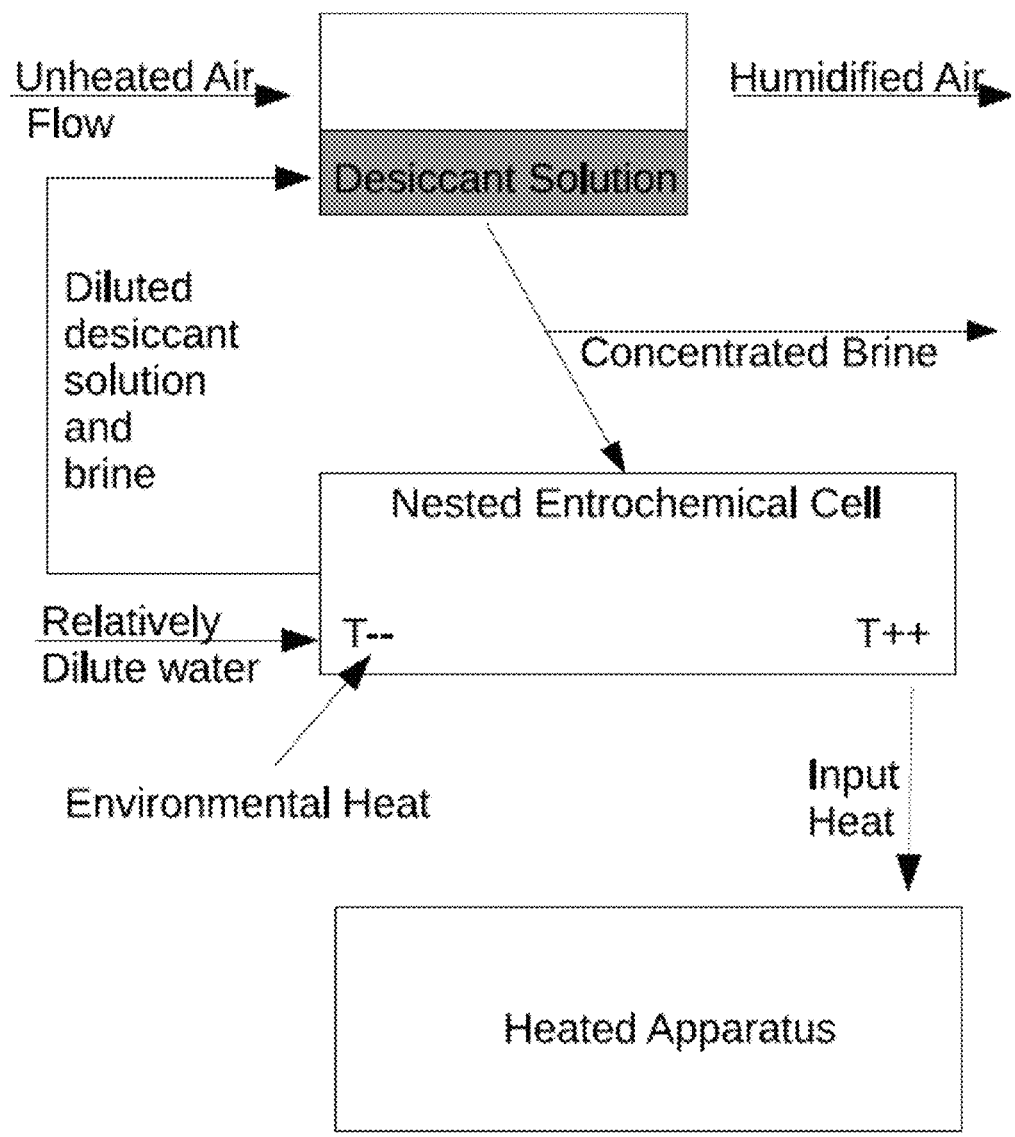
FIG. 9 shows a schematic flow diagram illustrating a process of entropy transfers that enables the acquisition of thermal energy from the environment in a closed container, in accordance with an embodiment of the invention.

The second mode of usage is disclosed in a schematic flow diagram (900) of the energy transfer system, as shown in FIG. 9. In the second mode of usage, thermal energy is absorbed from the environment and is deposited in a closed system. This mode of operation can be applied to environmentally-friendly heating, cooking, distillation, and a variety of other thermal processes with the energy transfer system that utilizes the acquisition of environmental thermal energy.

Figure 10:
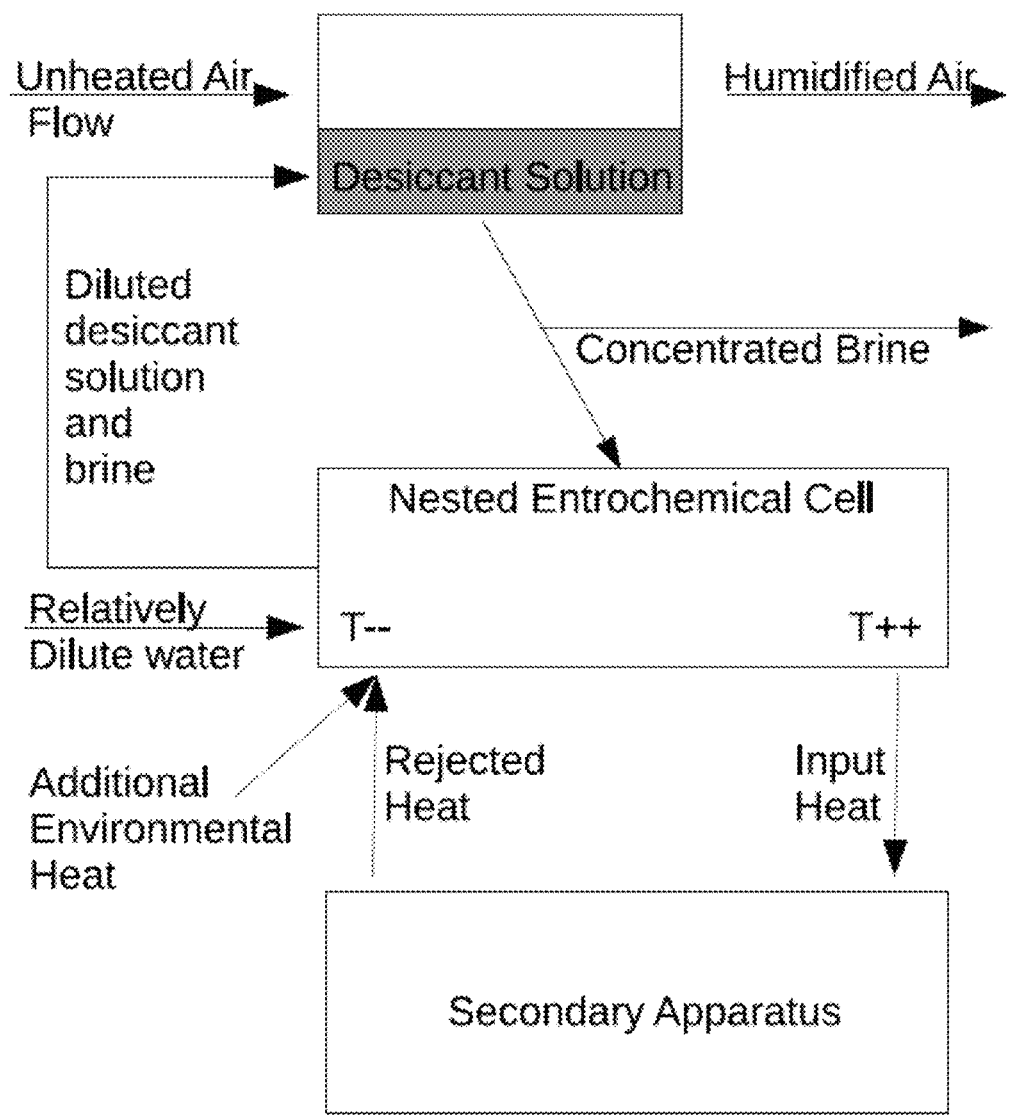
FIG. 10 shows a schematic flow diagram illustrating a process of entropy transfers that enables the acquisition of thermal energy from both the environment and one part of an apparatus, and the deposition of thermal energy in another part of the apparatus to perform useful work, in accordance with an embodiment of the invention.

In addition, the third mode of usage is disclosed in a schematic flow diagram(1000) of the energy transfer system, as shown in FIG. 10. In the third mode of usage, thermal energy is absorbed from one part of a closed system and deposited in another part of the same closed system. This mode of operation enables energy transfer processes that require both input and rejection of heat, such as distillation, electrical power generation, and motive force generation.

It is well understood for one of ordinary skill in the art that a "perpetual motion machine" that attempts to harvest thermal energy from a closed system in order to do work within the system defies the thermodynamic laws of physics, and is thus unfeasible. From entropic perspective, a hypothetical perpetual motion machine would necessitate an increase of the systemic entropy and theoretically result in an infinite entropy. Because a closed system cannot have an infinite entropy, the hypothetical perpetual motion machine is impracticable.

In contrast, the novel energy transfer system, as disclosed in various embodiments of the invention, does not defy the thermodynamic laws of physics, because Earth is not a closed system. Rather, our planet is an open system with continuous cyclic transfers of energy through planetary rotations and natural planetary thermal transfers between days and nights. Because energy flows through Earth continuously, with a net influx of thermal energy during a day and a net outflow of thermal energy at night, the novel energy transfer system as embodied in the present invention is able to acquire environmental thermal energy and perform useful work for human needs.

The influx of energy increases the entropic potential of the environment by raising the maximal vapor pressure of water daily. The outflow of energy nightly decreases the entropic potential of the same environment, thus resulting in a reduction of the maximal vapor carried by the atmosphere. If the maximal vapor pressure decreases sufficiently, the vapor condenses to form moistures and to influence weather patterns. Entropy leaves the atmosphere as the heat leaves, restoring the system daily. The energy transfer system and the corresponding process of acquiring environmental thermal energy to perform useful work, as embodied by the present invention, utilize Earth's daily and cyclical energy flux.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for extracting environmental thermal energy with an energy transfer system, the method comprising the steps of:

generating a concentrated water solution from a water solution containing a non-volatile solute by bringing the water solution into contact with a quantity of air containing less water vapor than an equilibrium vapor pressure of the water solution;

developing a thermal gradient per entrochemical cell inside a linear entrochemical array contained in the energy transfer system, wherein the concentrated water solution is deposited into a first chamber of an entrochemical cell of the linear entrochemical array, and wherein a lower concentration solution is deposited into a second chamber of the entrochemical cell of the linear entrochemical array;

agitating the concentrated water solution in the first chamber by at least one of bubble generation and mechanical mixing to prevent an energy transfer-hampering film formation on a surface of the concentrated water solution;

generating a wet vacuum in the entrochemical cell of the linear entrochemical array to induce the thermal gradient per entrochemical cell inside the linear entrochemical array; and generating an aggregate thermal gradient by accumulating a plurality of the thermal gradient per entrochemical cell inside the linear entrochemical array contained in the energy transfer system.

2. The method of claim 1, wherein the aggregate thermal gradient generated by the energy transfer system provides heat to an external device or an external process outside of the energy transfer system.

3. The method of claim 1, wherein the aggregate thermal gradient generated by the energy transfer system absorbs thermal energy from an external device or an external process outside of the energy transfer system.

4. The method of claim 1, wherein the aggregate thermal gradient generated by the energy transfer system absorbs thermal energy from one part of an external device or an external process and delivers at least a portion of the thermal energy to another part of the external device or the external process outside of the energy transfer system.

5. The method of claim 1, wherein the step of bringing the water solution into contact with the quantity of air utilizes air circulation provided by a solar chimney or another air circulation device.

6. The method of claim 2, wherein the external device is a space heater, a water heater, a stove, an oven, a reaction chamber, a distiller, an electrical power generator, a motor, or an engine.

7. The method of claim 3, wherein the external device is a refrigerator, a freezer, an air conditioner, a chiller, or another device for limiting an operational temperature.

8. The method of claim 3, wherein the external device is an electrical power generator, a motor, an engine, or a reaction chamber.

9. The method of claim 4, wherein the external device is a reaction chamber, a distiller, an electrical power generator, a motor, an engine, or a pump.

* * * * *